April 15, 1924.
W. F. MacGREGOR
WHEEL
Filed May 4, 1922
1,490,574
2 Sheets-Sheet 1
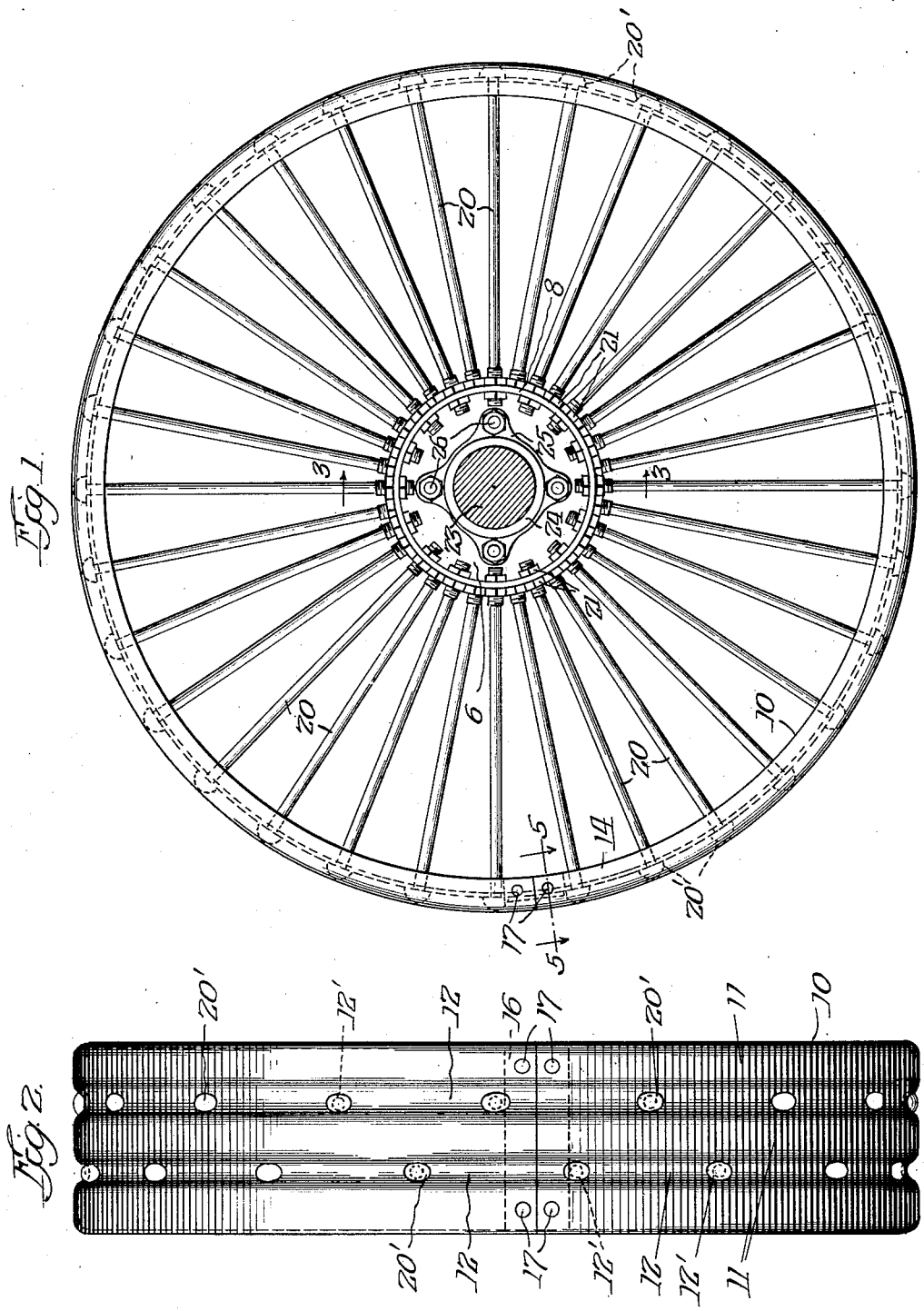

April 15, 1924.
W. F. MacGREGOR
WHEEL
Filed May 4, 1922
1,490,574
2 Sheets-Sheet 2
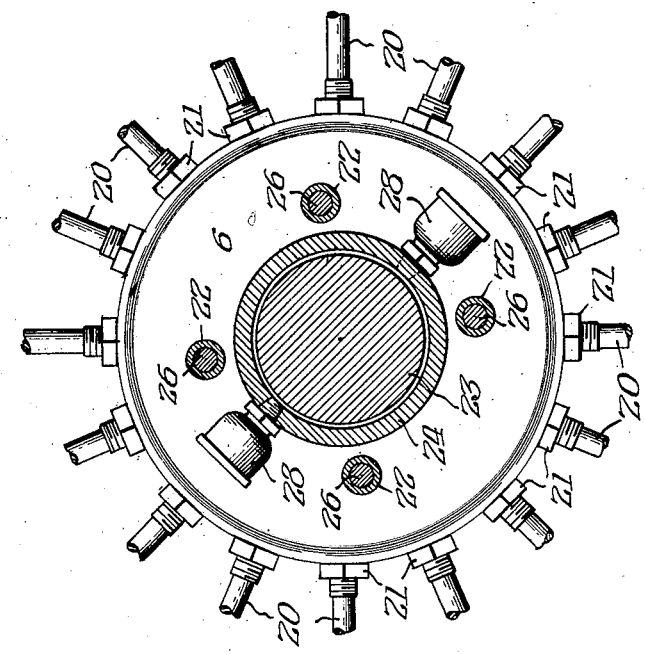
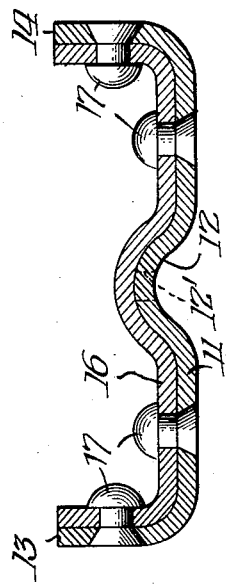
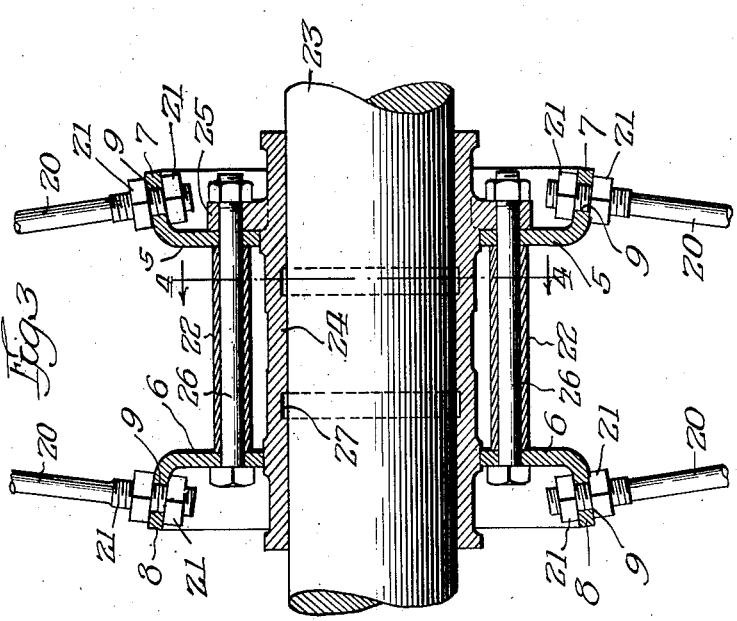
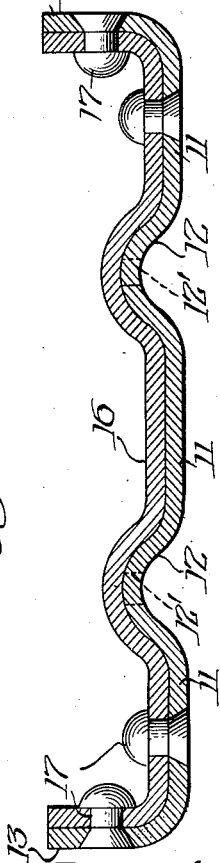
Inventor
Wallace F. MacGregor
By James A. Walsh,
Atty.

Patented Apr. 15, 1924.

1,490,574

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

WHEEL.

Application filed May 4, 1922. Serial No. 558,498.

*To all whom it may concern:*

Be it known that I, WALLACE F. MAC-GREGOR, a citizen of the United States, residing at Racine, in the county of Racine and State of Wisconsin, have invented certain new and useful Improvements in Wheels, of which the following is a specification.

My present invention relates to metal wheels especially adapted for use with heavy farm vehicles such as threshers, tractors and the like, the object being to produce such a wheel of extreme strength assembled in rigid position with its spokes and hub arranged to be readily removed for replacement or otherwise, and which will be highly durable and of a character permitting employment of a comparatively wide tire for providing ample tread in soft soil for heavy vehicles.

In the accompanying drawings, forming part hereof, Figures 1 and 2 are elevations of a wheel embodying my invention; Fig. 3, a transverse vertical section of the wheel-hub and parts associated therewith; Fig. 4, a fragmentary elevation showing one of the spoke-holding disks and associated parts which I employ, as seen when looking in the direction indicated by the arrows 4—4 in Fig. 3, parts being shown in section; Fig. 5, a transverse sectional view of the tire taken on the dotted line 5—5 in Fig 1; and Fig. 6 is a transverse sectional view of a modified form of the tire.

In said drawings, the portions marked, 5, 6, indicate outer and inner disks having flanges, 7, 8, thereon in which spoke holes, 9, are provided. The tire, 10, is of considerable width, and in cross section is of the conformation indicated in Figs. 5 and 6, that is, it comprises a plurality of outward depressions, such as 11, having one or more apertured channels, 12, therebetween, with inwardly projecting flanges, 13, 14, at either side of the tire. Said tire is connected by a plate, 16, of similar conformation to the tire, the ends of the tire being secured to such plate by rivets, 17, or otherwise, but it will be understood that the tire ends may be connected in any suitable manner. The tire and disks 5, 6, are connected by spokes, 20, which are passed through the holes, 12', in the tire channels and through said disks, the ends of the spokes being screw-threaded so that nuts, 21, may be applied thereto on either side of the disk flange. In order to maintain disks 5, 6, equi-distant and in alignment I interpose tubing, as 22, therebetween, one of the functions of the tubes being to firmly hold the disks apart against pressure exerted by the angular assemblage of the spokes, tire and disks. When positioning the wheel upon a vehicle the tubes may be passed over the axle, 23, and the hub, 24, then inserted between the axle and disks, after which a locking-plate or cap, 25, forming part of said hub, is secured to disks 5, 6, by bolts, 26, which pass through said plate, disks and the tubing 22. It will be understood, of course, that my improved wheel may be completely assembled before positioning it upon the axle, or in the manner just described, as the tubes 26 maintain the disks in spaced relationship independently of the hub. Said hub 24 is provided with oil channels, 27, which are provided with lubricant from oil cups, 28, in a well-known manner. By forming the tire in the manner indicated with recessed seats for the spokes 20, the heads, 20', thereof are protected by the ribs or outward depressions 11, and as such heads are substantially flush with the surface of said ribs a tread is provided having considerable tractional power.

As will be noted, the wheel comprises two rows of spokes which when assembled with the tire, disks and hub, form a rigid structure of a highly stable and durable character, and the parts of which may be readily replaced for repair, as the spokes 20 and also the hub 24, in the manner heretofore indicated, which latter may from time to time require renewal because of wear of its inner surface upon the axle. It will also be understood that by crimping the tire and flanging the same at each side further rigidity is imparted to the wheel as a whole, and which when so assembled and locked in the various ways indicated produces a strong and comparatively light wheel for the purpose and one which is capable of repair while mounted on the vehicle axle, which is of considerable importance and particularly so when applying a new hub, which can be readily assembled with the axle and wheel parts after removing the worn hub.

I claim as my invention.

1. In a wheel, flanged discs disconnected and spaced from each other, a plurality of removable tubular members positioned between said discs for maintaining the same in constant spaced relation, a hub removably mounted in said discs, a removable plate mounted upon said hub, a plurality of means for connecting said hub, plate, discs and tubular members together, spokes detachably secured at one end to said discs, and a tire secured to the opposite ends of said spokes.

2. In a wheel, a pair of outwardly flanged discs disconnected and spaced from each other, a plurality of removable tubular members positioned between said discs for maintaining the same in constant spaced relation and alignment, a hub removably mounted in said discs, a plate removably mounted on said hub, and a plurality of bolts passing through said plate, discs and tubular members for securing the same and said hub together.

In testimony whereof I affix my signature.

WALLACE F. MacGREGOR.